Feb. 21, 1956  R. J. COOK  2,735,421
SHAPING OF BODIES OF CRYSTALLINE CARBON
Filed Oct. 20, 1952

Inventor
Robin John Cook
By:
Henderoth, Lind + Ponack
Attorneys.

United States Patent Office 2,735,421
Patented Feb. 21, 1956

2,735,421
SHAPING OF BODIES OF CRYSTALLINE CARBON

Robin J. Cook, Florida, Transvaal, Union of South Africa, assignor, by mesne assignments, to Diamond Abrasive Products Limited, Johannesburg, Transvaal, Union of South Africa Application October 20, 1952, Serial No. 315,701

Claims priority, application Great Britain October 22, 1951

13 Claims. (Cl. 125—30)

This invention relates to the shaping of bodies of crystalline carbon such as diamond, framesite, stewartite, carbonado and the like.

The shaping of bodies of crystalline carbon by known methods is a lengthy, tedious, difficult and expensive process calling for the exercise of a specialist's skill. The directional effects resulting from the crystalline structure make it impossible to reduce the bodies to spherical or spheroidal shape by a grinding operation alone; so that it is necessary to carry out an initial bruting operation before grinding or polishing is undertaken. It is obvious that so intricate and difficult a process is scarcely economic when dealing with small bodies and indeed bodies below a certain size cannot be thus handled. At the same time there exists a greater demand for industrial purposes for bodies of rounded shape than can be satisfied by bodies which are round when won.

The object of the present invention is to provide a method and means of rounding such bodies which is very much more rapid, certain and inexpensive than can be achieved by known methods and which can be used to round bodies too small to be handled or to be handled economically by existing methods.

The method of the invention consists in centrifuging one, and preferably a number, of bodies in contact with a circumferential wall at least the surface of which is composed of hard metal.

The term "hard metal" when used in this specification includes carbides, nitrides and the like commonly classed as hard metals.

On the face of it, centrifuging of these bodies in contact with an abrasive surface would appear to offer no practical possibility of producing a rounded body, because the haphazard presentation of the faces to the surface would seem to be the exact equivalent of a haphazard presentation of such a body to a lapping wheel; a procedure which persons skilled in the art know to be sterile.

It is, therefore, a matter of considerable surprise that the method of the invention does in fact produce rounded bodies; and applicant can only explain this unexpected result by assuming that the process must in fact be a species of bruting process in which the bodies are rounded by impact against the wall and possibly also against one another; and that if grinding does take place it is a secondary operation.

Whatever the reason, however, it is the case that bodies treated according to the invention are rounded rapidly to a degree which enhances their commercial value very substantially.

The method of the invention consists further in confining a body and preferably a number of bodies within a cylindrical space bounded by a circumferential wall as above specified, injecting pressure fluid into the space to centrifuge the body or bodies; and recovering, from fluid discharged from the space, detritus entrained in the fluid. Preferably the fluid is atmospheric air or a gas.

Apparatus for putting the method to use consists in a cylindrical casing the surface layers at least of the circumferential wall of which are composed wholly or preponderantly of hard metal, means of access for introduction of rough bodies; and means to inject pressure fluid, and preferably air or gas, substantially tangentially into the casing.

An embodiment of apparatus according to the invention is illustrated in the accompanying drawings, in which—

Figure 1:
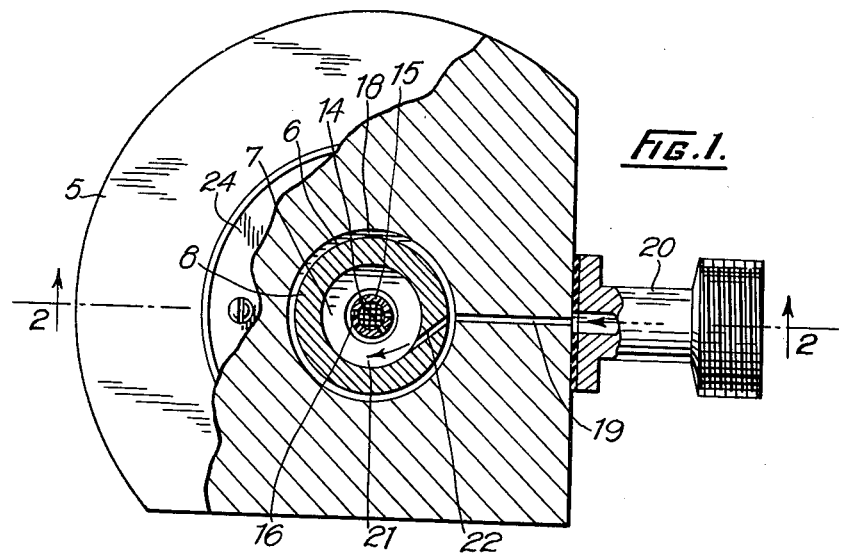
Figure 1 is an elevation of the apparatus mostly in section.
Figure 2:
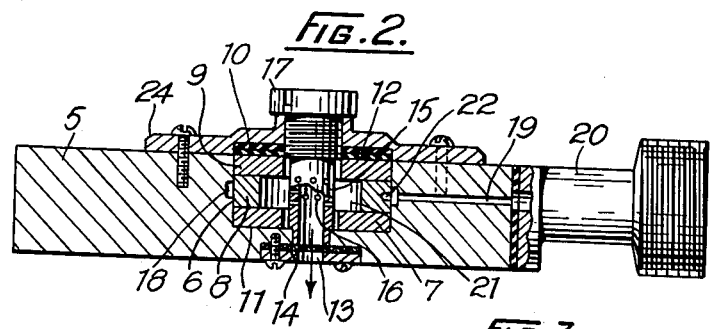
Figure 2 is a section on the line 2—2 of Figure 1.

The apparatus illustrated in Figures 1 and 2 consists in a massive block 5, for example made of brass, with a cylindrical recess 6. In the recess 6 there are housed in the direction from the base 11 of the recess towards its mouth 12, a washer 7, a ring 8, a washer 9 and a gasket 10. The washers 7 and 9 and the ring 8 are made of cemented tungsten carbide. A cover plate 24 holds the assembly in the recess.

The base 11 of the recess is provided with an axial aperture 13 which is fitted with a wire gauze screen 14. An axial tube 15 extends from the cover plate 24 to the screen 14. The tube 15 is provided with perforations 16 at the level of the ring 8.

To provide access to the cavity 21 defined between the ring 8 and the tube 15, the latter is attached to a screw head 17 which screws into the cover plate 24.

The circumferential wall of the recess 6 is provided with an annular groove 18 from which leads a passage 19 opening into a coupling 20. Communication between the groove 18 and the cavity 21 is by means of an injecting hole 22 which is substantially tangential to the inner circumference of the ring 8.

In use, the cavity 21 is charged with a number of bodies to be treated by unscrewing the head 17. After the cavity has been charged the head is replaced. The coupling 20 is connected to a source of compressed air. The air passes along the passage 19 into the groove 18 and through the tangential hole 22 into the cavity 21. It will be seen that the air subjects the bodies to a centrifuging action in the cylindrical space provided by the cavity 21 and bounded by a circumferential wall provided by the ring 8.

The air passes through the perforations 16 into the tube 15 and through the screen 14. Air escaping through the screen 14 is filtered or otherwise treated for the recovery of entrained detritus.

The ring 8 is made of a very fine grained cemented tungsten carbide to achieve the most lasting qualities. However, applicant anticipates that the carbide grade will vary with the size of the bodies being treated. With bodies of minus 9 plus 10 mesh Tyler applicant has found that an air pressure of between 17 and 19 pounds per square inch gives the best results.

Figure 3:
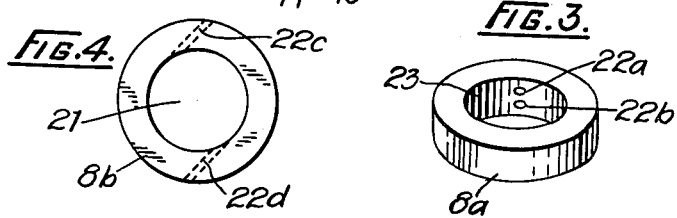
Figure 3 is a perspective view of a circumferential wall.

In Figure 3 a modified form of ring 8a has been illustrated. In this ring there are two injecting holes 22a and 22b side by side. This construction minimizes the concentration of the jet of air and consequently lessens the wear on the zone 23 of the ring 8a opposite the holes 22a and 22b.

Figure 4:
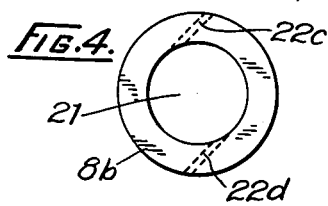
Figure 4 is an elevation of a circumferential wall.

In Figure 4 two holes 22c and 22d are illustrated at opposite ends of the ring 8b. The holes 22c and 22d enter the cavity 21 in the same rotational sense. The term "gem stones" used in the appended claims is intended to include stones used for industrial purposes.

I claim:
1. An apparatus for shaping bodies of crystalline car- bon comprising a cylindrical casing having its inner wall composed of hard metal, access means at the top portion of the casing for introducing said bodies into said casing, means for injecting a jet of high pressure fluid tangentially into the casing, and a tubular member positioned axially of the cylindrical casing to provide an outlet for said fluid from the casing.

2. The apparatus claimed in claim 1 in which the wall consists in a ring of cemented tungsten carbide.

3. The apparatus claimed in claim 1 in which the wall consists in a ring of cemented tungsten carbide pierced by at least one passage opening out substantially tangentially to the inner circumference of the ring.

4. The apparatus claimed in claim 3 including two jets in the same tangent plane.

5. The apparatus claimed in claim 3 including two jets on parallel tangent planes.

6. A method of shaping crystalline carbon gem stones consisting in charging the stones into a cylindrical space bounded by a circumferential wall at least the surface of which is composed of hard metal, substantially tangentially injecting pressure fluid into the space to repeatedly circulate the stones circumferentially of the space and to centrifuge the stones and discharging the fluid axially of the space.

7. A method according to claim 6 in which the hard metal is cemented tungsten carbide.

8. A method according to claim 6 in which the fluid is a gas.

9. A method according to claim 6 in which the fluid is air.

10. A method of shaping crystalline carbon gem stones comprising charging said stones into a cylindrical space, and subjecting the stones to the action of a high pressure fluid jet while the stones are in the cylindrical space to drive them circumferentially within the space and repeatedly circulate them relative to and in contact with a stationary circumferential hard metal wall completely surrounding the space.

11. The method as set forth in claim 10 wherein the fluid pressure is about 19 lbs./sq. inch and is introduced tangentially into the cylindrical space.

12. A method of shaping crystalline carbon gem stones comprising charging the stones into an annular space bounded by a wall the surface of which is composed of hard metal, subjecting said stones to a jet of high pressure fluid to repeatedly circulate the bodies circumferentially of the space and discharging the fluid axially of the space.

13. A method of shaping crystalline carbon gem stones comprising confining said stones within a closed cylindrical space the circumferential wall of which is composed of hard metal, injecting a jet of high pressure fluid through a small opening in the circumferential wall to subject said stones to repeated circulation in the cylindrical space in contact with each other and with the cylindrical wall, and discharging the fluid axially of the space.

References Cited in the file of this patent

UNITED STATES PATENTS

| | | |
|---|---|---|
| 860,404 | Moussette | July 16, 1907 |
| 1,508,345 | Lupo | Sept. 9, 1924 |
| 1,549,615 | Schroter | Aug. 11, 1925 |
| 1,590,655 | Spicer | June 29, 1926 |
| 1,647,249 | Podszus | Nov. 1, 1927 |
| 2,041,346 | Jaques | May 19, 1936 |
| 2,123,635 | Moore | July 12, 1938 |
| 2,175,457 | Dunn | Oct. 10, 1939 |
| 2,242,901 | Birch | May 20, 1941 |
| 2,566,103 | Weston | Apr. 28, 1951 |
| 2,612,889 | Heyman | Oct. 7, 1952 |